United States Patent
Hung et al.

(10) Patent No.: US 10,645,166 B2
(45) Date of Patent: May 5, 2020

(54) NETWORK INTERFACE CARD

(71) Applicant: REALTEK SEMICONDUCTOR CORPORATION, Hsinchu (TW)

(72) Inventors: Sheng-Kai Hung, Hsinchu County (TW); Hung-Tai Chen, Hsinchu County (TW); E-Cheng Cheng, Yunlin County (TW); Chi Yang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 148 days.

(21) Appl. No.: 15/941,699

(22) Filed: Mar. 30, 2018

(65) Prior Publication Data
US 2018/0343302 A1 Nov. 29, 2018

(30) Foreign Application Priority Data
May 26, 2017 (TW) ................. 106117532 A (51) Int. Cl.
*H04L 29/08* (2006.01)
*H04L 29/06* (2006.01)
(Continued)

(52) U.S. Cl.
CPC ........ *H04L 67/1097* (2013.01); *G06F 1/3209* (2013.01); *G06F 1/3228* (2013.01);
(Continued)

(58) Field of Classification Search
CPC .... G06F 1/3209; G06F 1/3228; G06F 3/0608; G06F 3/0625; G06F 3/0635;
(Continued)

(56) References Cited

U.S. PATENT DOCUMENTS 6,826,613 B1 * 11/2004 Wang .................. G06F 3/0607
709/202
8,010,469 B2 * 8/2011 Kapoor .................. G06F 9/505
706/20
(Continued)

FOREIGN PATENT DOCUMENTS

CN          1968203 A      5/2007

OTHER PUBLICATIONS

Information Sciences Institute. "Internet Protocol: DARPA Internet Program Protocol Specification", RFC 791, Sep. 1981, 49 pages. (Year: 1981).*
(Continued)

*Primary Examiner* — George C Neurauter, Jr.
(74) *Attorney, Agent, or Firm* — WPAT, PC (57) ABSTRACT

A data management circuit with network functions and a network-based data management method are provided. The network-based data management method is employed to manage a storage device coupled to a computer that includes a processor. The method includes steps of: receiving a network packet through a network; sending the network packet to the processor or accessing the storage device, according to a network header of the network packet; and requesting the processor to access the storage device according to a remaining capacity of the storage device and/or a content of the network packet.

16 Claims, 7 Drawing Sheets

(51) Int. Cl.
   *G06F 3/06* (2006.01)
   *G06F 1/3228* (2019.01)
   *G06F 1/3209* (2019.01)
   *G06F 21/81* (2013.01)
   *G06F 13/40* (2006.01)
   *G06F 13/362* (2006.01)
   *G06F 16/17* (2019.01)

(52) U.S. Cl.
   CPC .......... *G06F 3/0604* (2013.01); *G06F 3/0605* (2013.01); *G06F 3/067* (2013.01); *G06F 3/0608* (2013.01); *G06F 3/0625* (2013.01); *G06F 3/0635* (2013.01); *G06F 3/0643* (2013.01); *G06F 3/0646* (2013.01); *G06F 13/362* (2013.01); *G06F 13/4022* (2013.01); *G06F 16/1737* (2019.01); *G06F 21/81* (2013.01); *H04L 29/08549* (2013.01); *H04L 67/06* (2013.01); *H04L 69/22* (2013.01); *G06F 2212/263* (2013.01)

(58) Field of Classification Search
   CPC ...... G06F 3/0643; G06F 3/0646; G06F 3/067; G06F 13/362; G06F 13/4022; G06F 16/1737; G06F 21/81; G06F 2212/263; H04L 29/08549; H04L 67/1097; H04L 69/22
   See application file for complete search history.

(56) References Cited

U.S. PATENT DOCUMENTS

| | | | | |
|---|---|---|---|---|
| 8,612,570 | B1* | 12/2013 | Nair | H04L 41/5003 709/224 |
| 10,230,544 | B1* | 3/2019 | McDowell | H04L 12/4645 |
| 2004/0013117 | A1* | 1/2004 | Hendel | H04L 49/90 370/394 |
| 2004/0143716 | A1* | 7/2004 | Hong | G06F 3/0605 711/170 |
| 2004/0205146 | A1* | 10/2004 | Kimura | G06F 1/3209 709/213 |
| 2010/0049881 | A1* | 2/2010 | Manor | G06F 1/3209 710/18 |
| 2010/0162382 | A1* | 6/2010 | Kim | H04L 43/18 726/13 |
| 2010/0332401 | A1* | 12/2010 | Prahlad | G06F 3/0649 705/80 |
| 2010/0333116 | A1* | 12/2010 | Prahlad | G06F 3/0649 719/328 |
| 2013/0215756 | A1* | 8/2013 | Jeon | H04L 67/2852 370/238 |
| 2014/0108665 | A1* | 4/2014 | Arora | H04L 67/141 709/227 |
| 2014/0245026 | A1* | 8/2014 | Bates | G06F 11/1435 713/190 |
| 2015/0373115 | A1* | 12/2015 | Breakstone | G06F 3/0685 709/217 |
| 2017/0006102 | A1* | 1/2017 | Mody | H04L 67/42 |
| 2017/0277477 | A1* | 9/2017 | Xi | G06F 3/067 |
| 2018/0034716 | A1* | 2/2018 | Bird | H04L 43/04 |
| 2018/0357429 | A1* | 12/2018 | Barzik | G06F 21/604 |
| 2019/0004701 | A1* | 1/2019 | Guim Bernat | G06F 3/061 |
| 2019/0026041 | A1* | 1/2019 | Volvovski | G06F 3/0634 |
| 2019/0179555 | A1* | 6/2019 | Cannata | G06F 13/4282 |
| 2019/0196569 | A1* | 6/2019 | Shen | G06F 1/3246 |
| 2019/0253513 | A1* | 8/2019 | Liu | H04L 67/2842 |

OTHER PUBLICATIONS

Taiwan Intellectual Property Office, "Office Action", dated Sep. 18, 2018. Summary of the OA letter: Reference 1(CN 1968203 A) renders claims 1, 5-9 obvious.

* cited by examiner

NETWORK INTERFACE CARD

BACKGROUND

1. Field of the Disclosure

This disclosure generally relates to data backup and data access, and, more particularly, to the network-based data management circuits and network-based data management methods.

2. Description of Related Art

Personal cloud systems typically depend on so-called network attached storages (NASs) or specialized servers; however, setting up these personal cloud systems often requires complicated procedures. Moreover, a personal computer also requires many settings before it can access a personal cloud system. Despite being able to provide powerful file access functions, such a personal cloud system lacks intuitive operation and usage convenience. Sometimes, users have to purchase additional devices or even provide dedicated networks to build their own personal cloud system.

SUMMARY

In view of the issues of the prior art, an object of this disclosure is to provide a data management circuit with network functions, so as to allow users to establish a personal cloud system that is easy to set up, low cost, and low power consumption.

A data management circuit with network functions is provided. The data management circuit with network functions is coupled to a processor of a computer and provides the computer with network accessing capabilities. The data management circuit with network functions includes a network interface, a memory storing a plurality of program instructions, a first data transmission interface, a second data transmission interface, and a control unit. The control unit, which is coupled to the processor through the first data transmission interface, coupled to a storage device through the second data transmission interface, and coupled to the memory, executes the program instructions to perform following steps: receiving a network packet from the network interface; sending the network packet to the processor through the first data transmission interface or accessing the storage device, according to a network header of the network packet; and requesting the processor to access the storage device according to a remaining capacity of the storage device and/or a content of the network packet.

A network-based data management method is also provided. The method is employed to manage a storage device coupled to a computer that includes a processor. The method includes steps of: receiving a network packet through a network; sending the network packet to the processor or accessing the storage device, according to a network header of the network packet; and requesting the processor to access the storage device according to a remaining capacity of the storage device and/or a content of the network packet.

The data management circuit with network functions of this disclosure can easily be combined with a personal computer to implement a personal cloud system. Based on a hybrid (or hierarchical) storage mode of this disclosure, a personal computer can maintain the functionality of a personal cloud system when the personal computer in a sleep mode or even powered off. Compared with the conventional technology, the disclosure has the advantage of quickly building a personal cloud system that is low cost and low power consumption.

These and other objectives of this disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a data management circuit with network functions and a network-based data management method. On account of that some or all elements of the data management circuit with network functions could be known, the detail of such elements is omitted provided that such detail has little to do with the features of this disclosure and this omission nowhere dissatisfies the specification and enablement requirements. Some or all of the processes of network-based data management method may be implemented by software and/or firmware, and can be performed by the data management circuit with network functions or its equivalent. A person having ordinary skill in the art can choose components or steps equivalent to those described in this specification to carry out this disclosure, which means that the scope of this disclosure is not limited to the embodiments in the specification.

Figure 1:
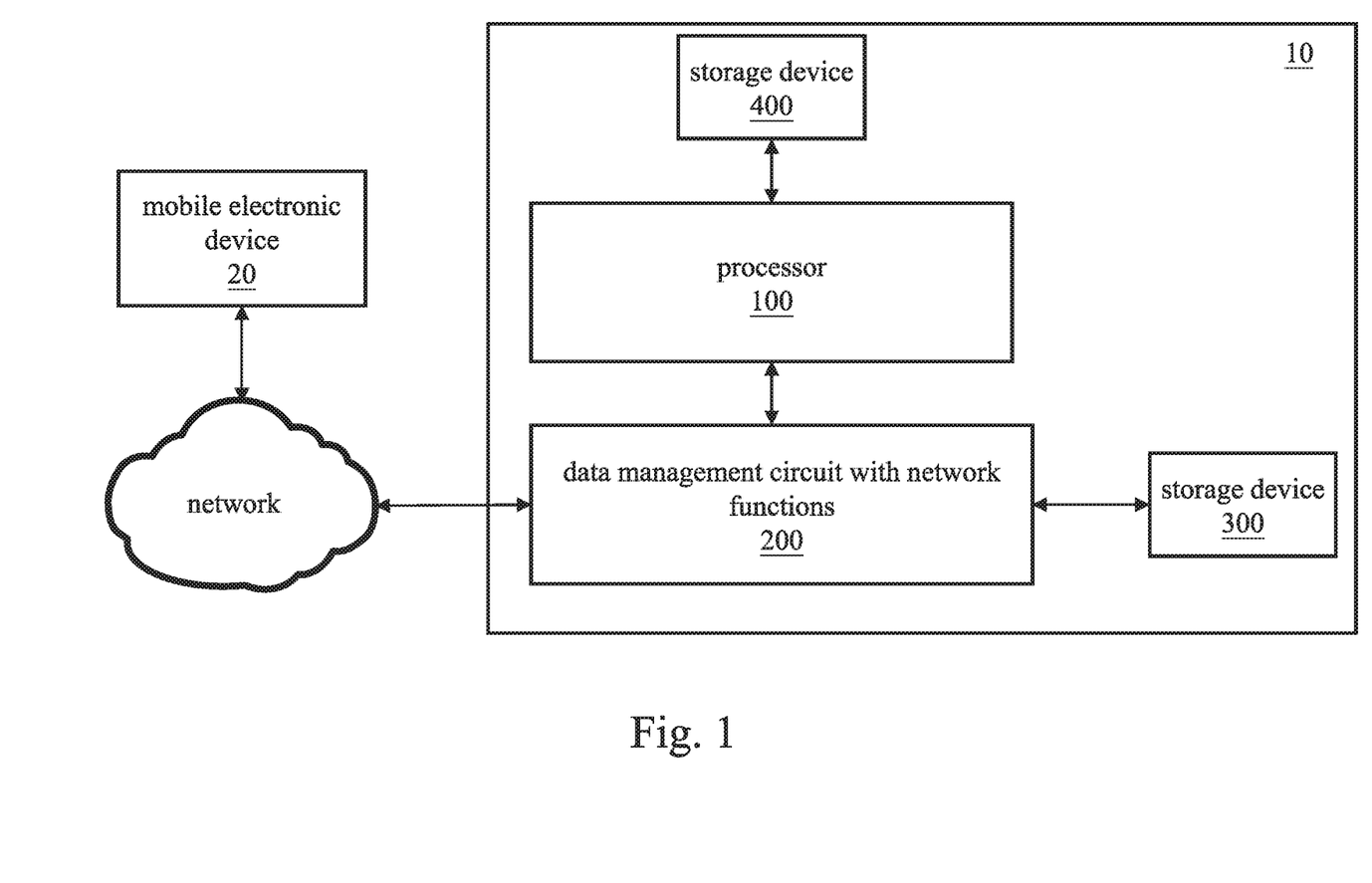
FIG. 1 illustrates a schematic diagram of a personal cloud system according to an embodiment of this disclosure.

FIG. 1 is a schematic diagram of a personal cloud system according to an embodiment of this disclosure. The personal cloud system 10 includes a processor 100, a data management circuit with network functions 200, a storage device 300, and a storage device 400. The personal cloud system 10 may be built on a personal computer (such as a desktop or notebook computer). In this case, the processor 100 is the central processing unit (CPU) of the personal computer, the storage device 300 and the storage device 400 are internal or external storage device of the personal computer, and the data management circuit with network functions 200 provides the personal computer with network accessing capabilities and is in charge of the data access mechanism of the personal cloud system 10. The processor 100 executes the operating system of the personal computer. The data management circuit with network functions 200 can independently access the storage device 300; that is, the data management circuit with network functions 200 can access the storage device 300 without the processor 100 getting involved. More specifically, the data management circuit with network functions 200 includes a control unit that executes an operating system or firmware to independently access the storage device 300. In this way, no matter whether the personal computer is in a normal operation mode, in which the personal computer is in a high power consumption state as, for example, the processor 100 is executing an operating system and can readily access the storage device 400, or in a power-off or sleep mode, in which the personal computer is in a low power consumption or no power consumption state as the processor 100 and the storage device 400 are not in operation, the data management circuit with network functions 200 can access the storage device 300, transmit network packets to the network, and receive network packets from the network as long as the data management circuit with network functions 200 can receive power (e.g., from a power supply of the personal computer or in an alternative manner).

In some embodiments, a network packet may also be referred to as a data packet.

The mobile electronic device 20 is a portable electronic device having network accessing capabilities, such as a smart phone, a tablet, a notebook computer, and the like. The mobile electronic device 20 can back up the data or files to the personal cloud system 10 through the network or read the data or files on the personal cloud system 10. The network discussed in this disclosure can be a wired network or a wireless network.

Figure 2:
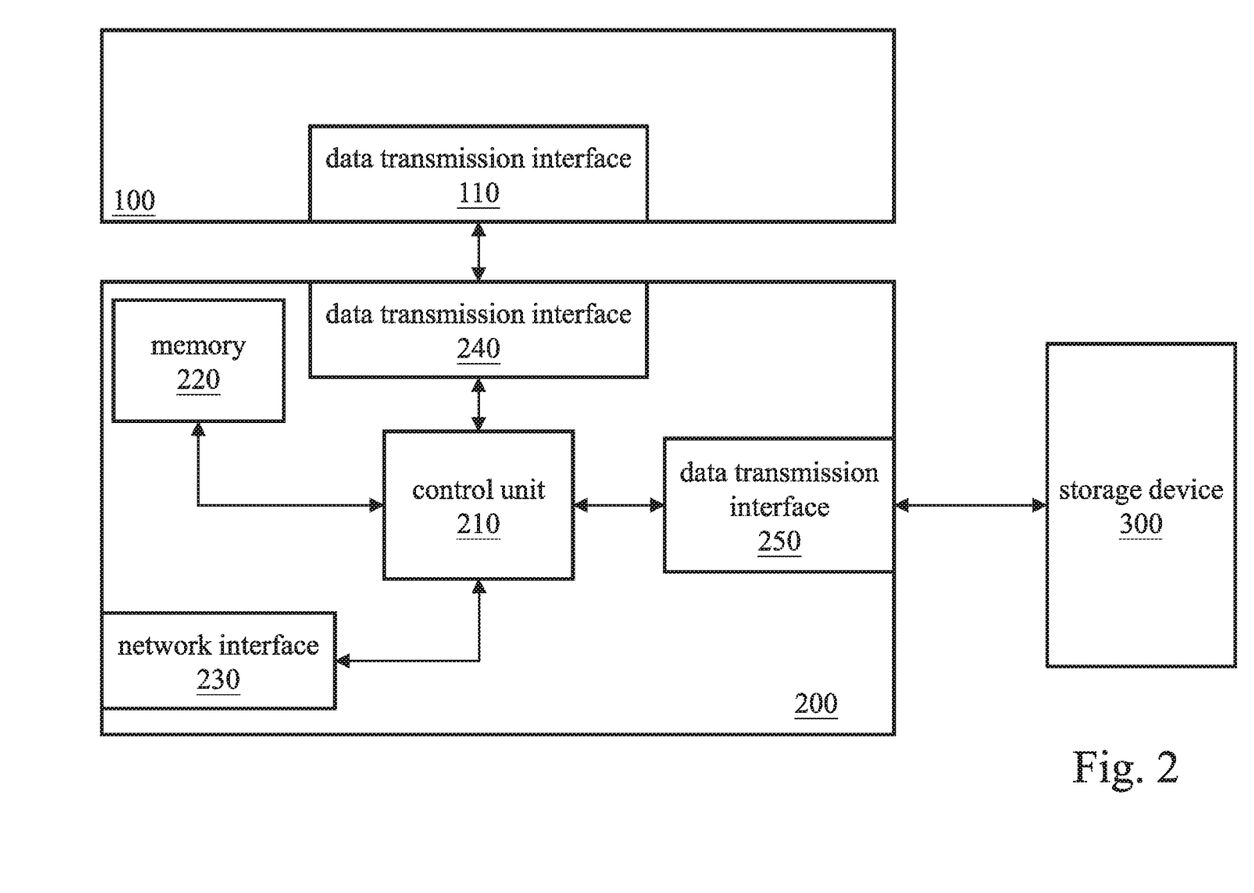
FIG. 2 illustrates a functional block diagram of the data management circuit with network functions according to this disclosure.

FIG. 2 is a detailed functional block diagram of the data management circuit with network functions 200 according to this disclosure. The data management circuit with network functions 200 includes a control unit 210, a memory 220, a network interface 230, a data transmission interface 240, and a data transmission interface 250. The control unit 210 is connected to the data transmission interface 110 of the processor 100 via the data transmission interface 240. In one embodiment, the data transmission interface 110 and the data transmission interface 240 may be peripheral component interconnect express (PCI-express, abbreviated PCIe) interfaces or other interfaces that the processor 100 supports. The control unit 210 is connected to the storage device 300 through the data transmission interface 250. The storage device 300 can receive power through the data transmission interface 250 or in an alternative manner. Through the network interface 230, the control unit 210 receives the network packets from the network or transmits the network packets to the network. The network interface 230 may be a wired network interface (such as an RJ45 socket) or a wireless network interface (such as Wi-Fi). The memory 220 stores program instructions, and the control unit 210 executes the program instructions to carry out the functions of the data management circuit with network functions 200. The functions include accessing the network, accessing the storage device 300, data management (e.g., the data access mechanism of the personal cloud system 10), and communicating with the processor 100. The processor 100 can access the storage device 300 through the data management circuit with network functions 200, and the time in which the processor 100 can access the storage device 300 is determined by the control unit 210.

Figure 3A:
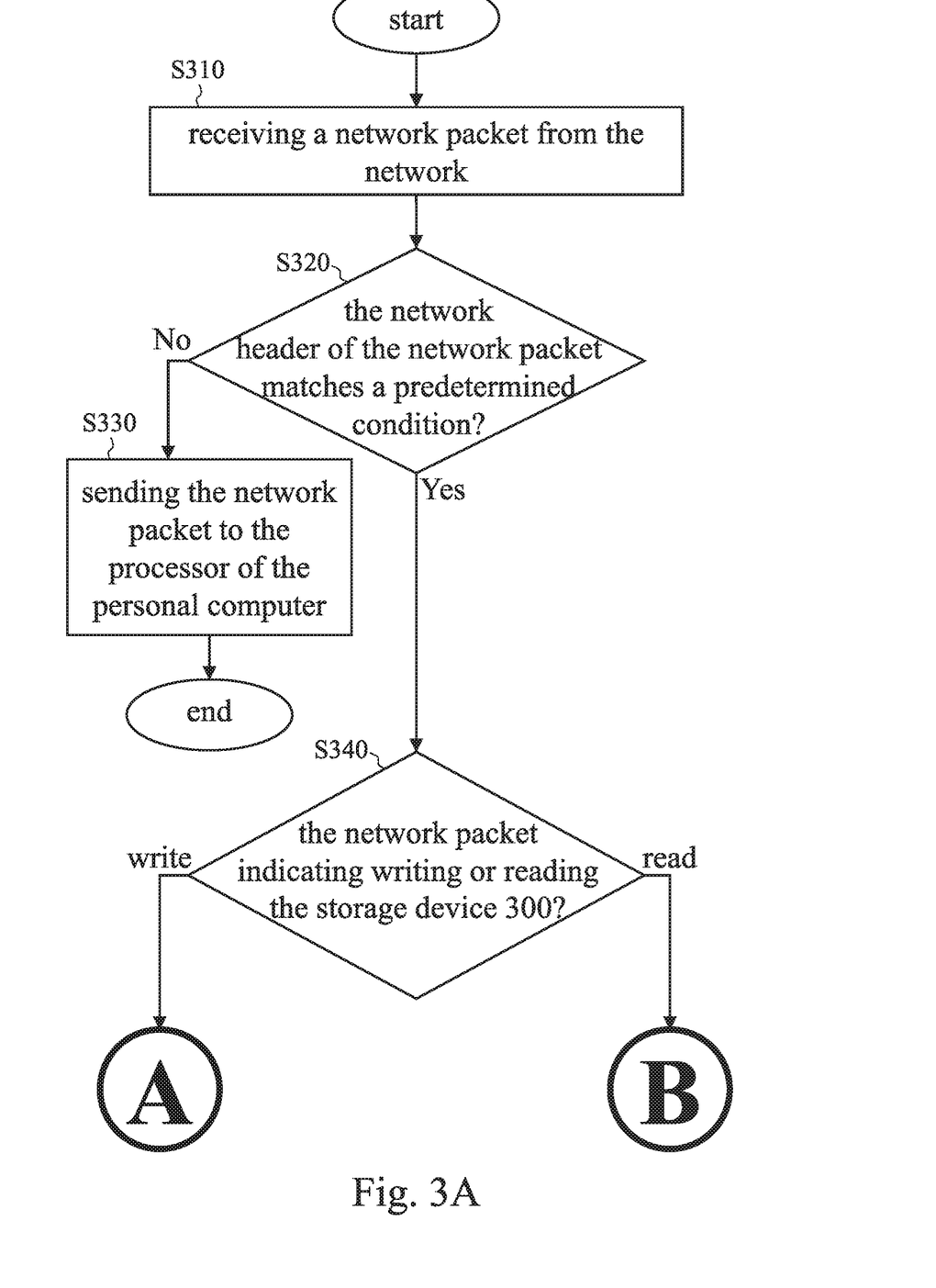
FIGS. 3A to 3C illustrate a flowchart of a network-based data management method according to an embodiment of this disclosure.
Figure 3B:
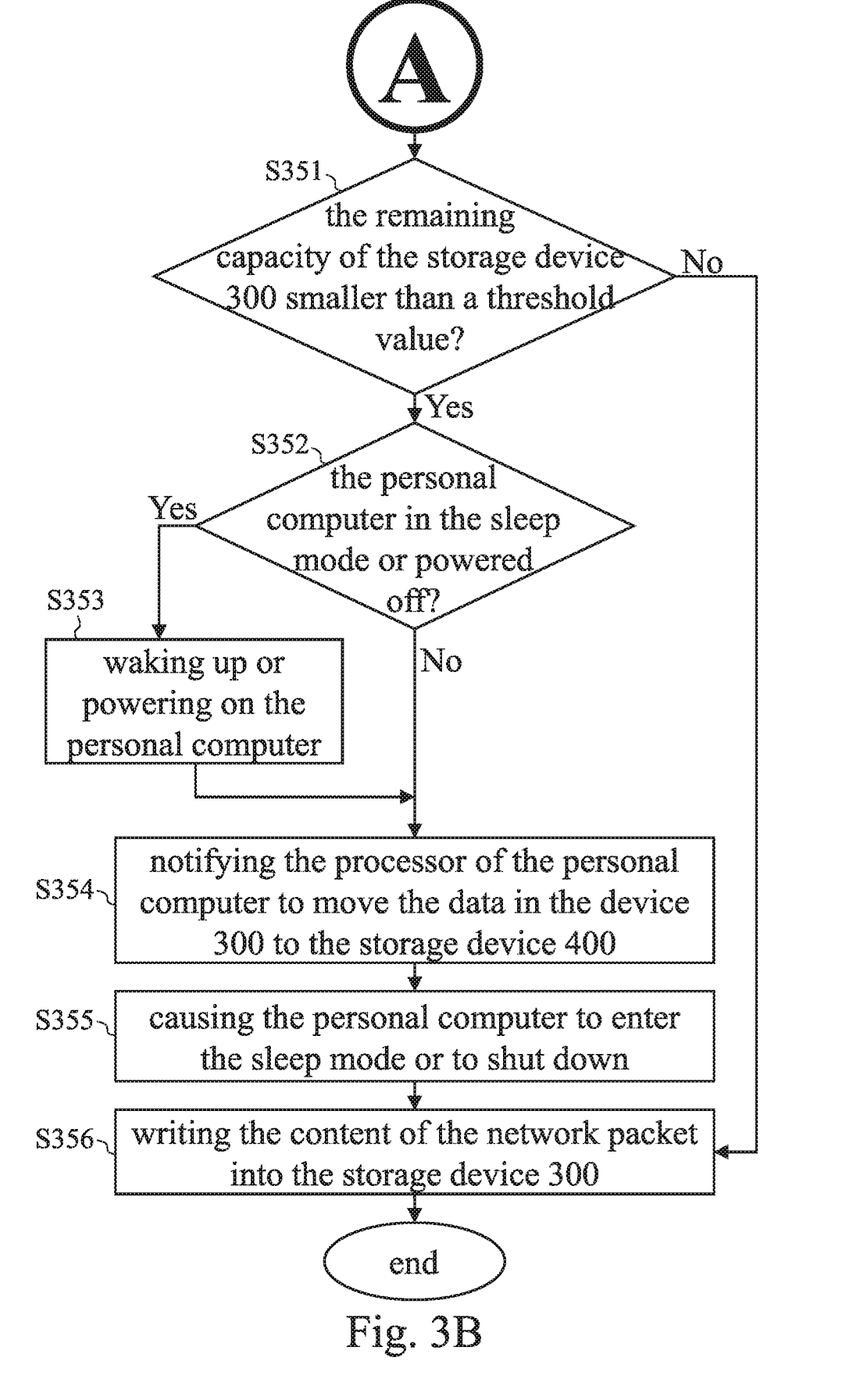
Figure 3C:
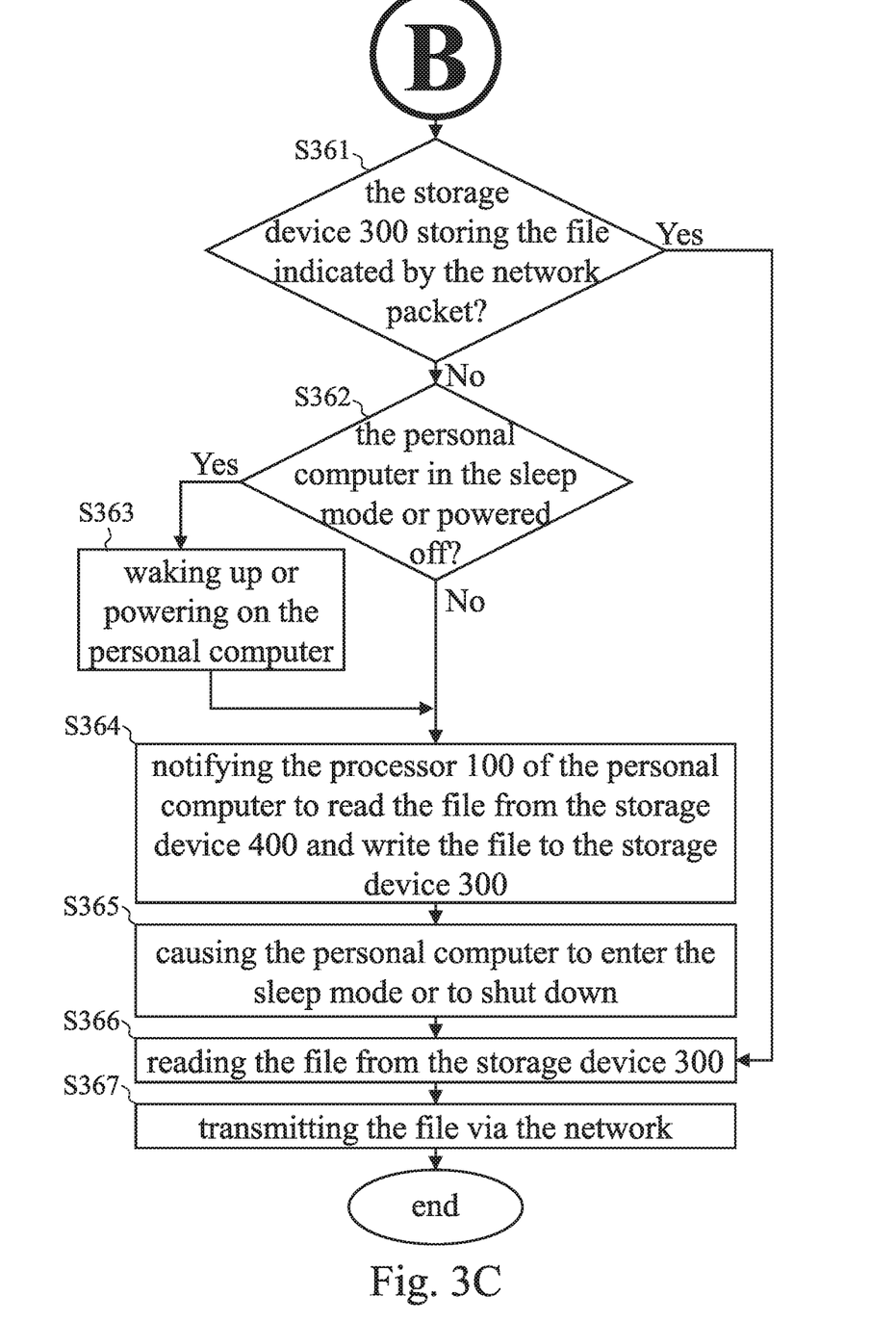

FIGS. 3A to 3C show a flowchart of a network-based data management method according to an embodiment of this disclosure. The operation details of the data management circuit with network functions 200 are discussed through this flowchart. After receiving a network packet from the network through the network interface 230 (step S310), the control unit 210 of the data management circuit with network functions 200 determines whether the network header of the network packet conforms to a predetermined condition (step S320). The network header includes one of a port number, an internet protocol address (IP address), a media access control address (MAC address), and a transmission control protocol, TCP) or user datagram protocol (UDP) header, or a combination thereof. Taking the port number as an example, if the predetermined condition is that the port number is 80, the control unit 210 treats the network packets not transmitted via port 80 as network packets transmitted to the operating system executed by the processor 100 (i.e., step S320 being negative); thus, the control unit 210 sends the network packets (including the network header and the packet content) to the processor 100 of the personal computer (step S330). If the network header conforms to the predetermined condition (step S320 being positive), the control unit 210 further determines in step S340 whether the content of the network packet indicates a process of writing data to the storage device 300 (e.g., the mobile electronic device 20 backs up the data to the personal cloud system 10) or the content of the network packet indicates a process of reading data from the storage device 300 (e.g., the mobile electronic device 20 attempts to retrieve data on the personal cloud system 10). The foregoing predetermined condition may be predefined between the application run on the mobile electronic device 20 and the operating system or firmware of the data management circuit with network functions 200, and the predetermined condition may be a combination of multiple rules or a single rule.

In step S340, when the network packet corresponds to the write operation, the process goes to FIG. 3B. In step S351, the control unit 210 determines whether the remaining capacity (i.e., the available storage space) of the storage device 300 is smaller than a threshold value. The threshold value is, for example, associated with the size of the file to be written and/or with the total capacity of the storage device 300. If step S351 is negative, indicating that the storage device 300 still has enough space to store the file to be written, the control unit 210 writes the content of the network packet into the storage device 300 (step S356). As discussed above, step S356 may be performed when the personal computer is in the normal operation mode, in the sleep mode, or even powered off. The file to be written may be made up of one or more network packets. Once step S356 is completed, i.e., the control unit 210 finishes the processing of the network packet, the control unit 210 then continues to process the next network packet. If step S351 is positive, the control unit 210 determines whether the personal computer is in the sleep mode or powered off (step S352). When step S352 is positive, the control unit 210 then wakes up or powers on the personal computer (step S353). When step S352 is negative or step S353 is completed (both of which implies that the personal computer is in this instance in the normal operation mode, in which the processor 100 is executing the operating system and accessing the storage device 400), the control unit 210 requests the processor 100 to move part or all of the data in the device 300 to the storage device 400 (step S354) to make more available space in the storage device 300. When learning that the processor 100 needs to access the storage device 300, the control unit 210 allows the processor 100 to access the storage device 300. In one embodiment, the data transmission interface 250 may be a universal serial bus (USB) interface, and the storage device 300 may be a USB storage device that supports hot swap (such as a USB flash drive, a USB hard disk, or any memory card accessed via a USB interface). In this case, the control unit 210 utilizes a standard, such as an open host controller interface (OHCI), a universal host controller interface (UHCI), an enhanced host controller interface (EHCI), or an eXtensible host controller interface (XHCI), to simulate the data management circuit with network functions 200 as a USB host, enabling the operating system executed by the processor 100 to recognize the storage device 300, which is a USB device, and to access the storage device 300 through the data management circuit with network functions 200. This technique is well known to those skilled in the art and is omitted for brevity. In step S354, the control unit 210 notifies or communicates with the processor 100 by, for example, changing the register values or sending messages. In some embodiments, a software daemon or a background program is installed on the personal computer to assist the processor 100 to communicate with the control unit 210 and to handle the processing of data transfer. The data to be transferred and the destination of the data transfer may be determined after the operating system or firmware of the data management circuit with network functions 200 communicates with the software daemon or the background program on the personal computer. The transferring of the data can be executed by the software daemon or the background program. After the data transfer is completed, the software daemon or the background program no longer controls the storage device 300 (for example, the control unit 210 does not allow the processor 100 to access the storage device 300). Next, the control unit 210 selectively, through the software daemon or the background program, causes the personal computer to enter the sleep mode or to shut down (step S355), and then executes step S356 to complete the processing of the network packet.

In some embodiments, in step S351, in addition to checking whether the remaining capacity of the storage device 300 is smaller than the threshold value, it is checked whether the available capacity of the storage device 400 is smaller than the threshold value or smaller than the remaining capacity of the storage device 300. If the available capacity of the storage device 400 is smaller than the threshold value or smaller than the remaining capacity of the storage device 300, the control unit 210 sends a message of insufficient capacity to the mobile electronic device 20 via the network interface 230.

In step S340, when the network packet corresponds to a read operation, the process goes to FIG. 3C. In step S361, the control unit 210 determines whether the storage device 300 stores the file designated by the network packet. When step S361 is positive, the control unit 210 reads the file from the storage device 300 (step S366) and then transmits the file to the mobile electronic device 20 via the network (step S367). Steps S366 and S367 may be performed when the personal computer is in the normal operation mode, in the sleep mode, or even powered off. When step S361 is negative, the control unit 210 then executes step S362 and selectively executes step S363. Steps S362 and S363 are similar to steps S352 and S353 and are thus omitted for brevity. In step S364, the control unit 210 requests the processor 100 of the personal computer to read the file from the storage device 400 and write the file to the storage device 300 (for example, executed by the software daemon or the background program on the personal computer). In step S364, the control unit 210 communicates with the processor 100 in a similar manner to step S354, and the details are thus omitted for brevity. After step S364 is completed, the daemon software or the background program no longer controls the storage device 300. Next, the control unit 210 selectively executes step S365 (optional) and executes steps S366 and S367 to send the file to the mobile electronic device 20.

In some embodiments, in the flow of FIGS. 3A to 3C, the control unit 210 temporarily does not allow the processor 100 to access the storage device 300 in steps S351 and S361. When the processor 100 needs to access the storage device 300 (for example, in steps S354 and S364), the control unit 210 temporarily allows the processor 100 to access the storage device 300, and in a subsequent operation when the control unit 210 needs to access the storage device 300 (for example, in steps S356 and S366), the control unit 210 does not allow the processor 100 to access the storage device 300.

Figure 4:
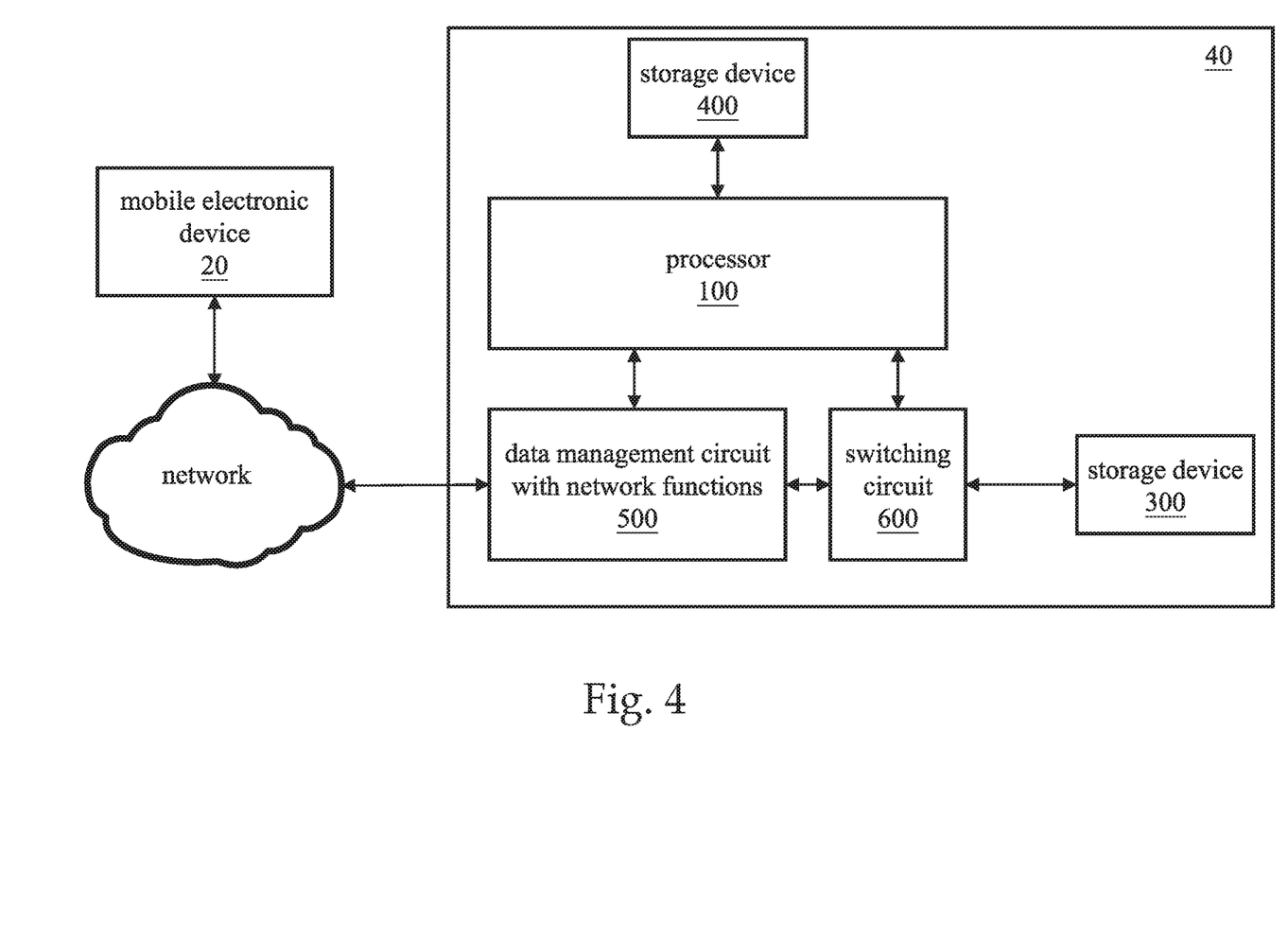
FIG. 4 illustrates a schematic diagram of a personal cloud system according to another embodiment of this disclosure.

FIG. 4 is a schematic diagram of a personal cloud system according to another embodiment of this disclosure. The personal cloud system 40 includes a processor 100, a data management circuit with network functions 500, a switching circuit 600, a storage device 300, and a storage device 400. The personal cloud system 40 may be built on a personal computer, and the data management circuit with network functions 500 provides the personal computer with network accessing capabilities and is in charge of the data access mechanism of the personal cloud system 40. Similarly, the data management circuit with network functions 500 has the capability of accessing the storage device 300 independently; that is, the data management circuit with network functions 500 can access the storage device 300 without the processor 100 getting involved. More specifically, the data management circuit with network functions 500 includes a control unit that executes an operating system or firmware to independently access the storage device 300. The processor 100 and the data management circuit with network functions 500 are both coupled to the storage device 300 through the switching circuit 600. The switching circuit 600 connects the storage device 300 to the processor 100 or the data management circuit with network functions 500. In other words, the switching circuit 600 determines that one of the processor 100 and the data management circuit with network functions 500 can access the storage device 300.

Figure 5:
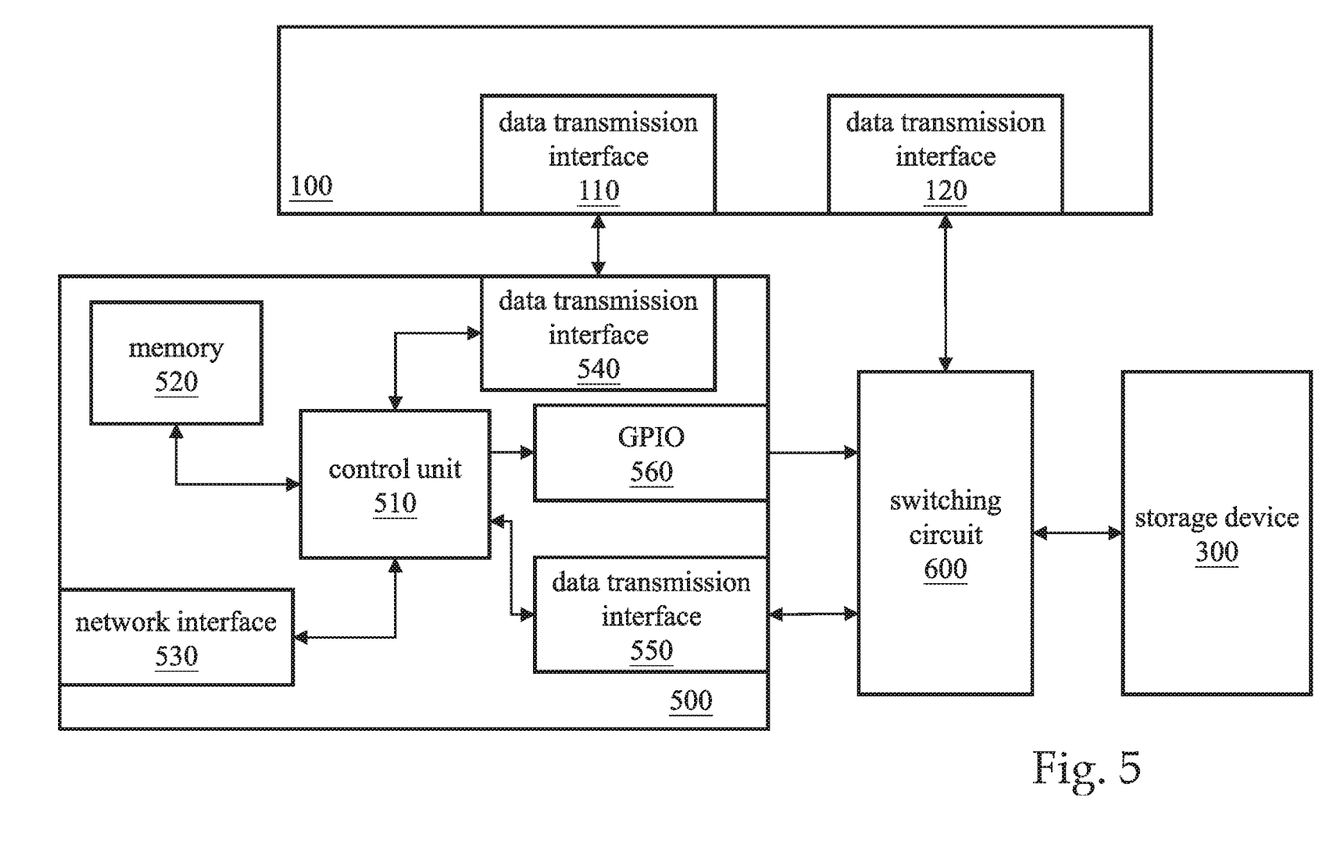
FIG. 5 illustrates a functional block diagram of the data management circuit with network functions according to another embodiment of this disclosure.

FIG. 5 is a detailed functional block diagram of the data management circuit with network functions 500 according to this disclosure. The data management circuit with network functions 500 includes a control unit 510, a memory 520, a network interface 530, a data transmission interface 540, a data transmission interface 550, and a general-purpose input/output (GPIO) 560. The control unit 510 is connected to the data transmission interface 110 of the processor 100 through the data transmission interface 540. In one embodiment, the data transmission interface 110 and the data transmission interface 540 may be the PCIe interfaces or other interfaces that the processor 100 supports. The control unit 510 is coupled to the switching circuit 600 through the data transmission interface 550. The processor 100 is coupled to the switching circuit 600 through the data transmission interface 120. The storage device 300 may receive power through the data transmission interface 550 or the data transmission interface 120, or in an alternative manner. Through the network interface 530, the control unit 510 receives the network packets from the network or transmits the network packets to the network. The network interface 530 may be a wired network interface or a wireless network interface. The memory 520 stores program instructions, and the control unit 510 executes the program instructions to carry out the functions of the data management circuit with network functions 500. The functions include accessing the network, accessing the storage device 300, data management (e.g., the data access mechanism of the personal cloud system 40), and communicating with the processor 100. The control unit 510 controls the switching of the switching circuit 600 through the GPIO 560.

The details of the operation of the data management circuit with network functions 500 can also correspond to the flowchart of FIGS. 3A to 3C, and thus the details of each step are omitted for brevity. However, for the personal cloud system 40, the control unit 510 further determines, in step S351 and step S361, whether the switching circuit 600 connects the storage device 300 to the processor 100 or to the data management circuit with network functions 500. If the switching circuit 600 connects the storage device 300 to the processor 100, the control unit 510 controls the switching circuit 600 to switch so that the control unit 510 can access the storage device 300. Similarly, in steps S354 and S364, the control unit 510 also controls the switching circuit 600 to switch in order that the processor 100 can access the storage device 300; in subsequent steps S356 and S366, the control unit 510 again controls the switching circuit 600 to switch in order that the control unit 510 can access the storage device 300. In some embodiments in which the data transmission interface 120 and the data transmission interface 550 may be USB interfaces, and the storage device 300 may be a USB storage device that supports hot swap, the switching circuit 600 is a USB switch.

In some embodiments, the data transmission interfaces 250 and 550 may be interfaces other than the USB interface, such as a secure digital (SD) interface.

The data management circuits with network functions 200 and 500 may also execute step 5351 at regular time intervals (e.g., by polling) when no network packet is received. In other embodiments, it is also feasible that the storage device 400 is remotely located (e.g., a storage device on a server). The foregoing operation of waking up or powering on the PC may employ the technology of network wake-up, including wake on WAN (WOW) and wake on LAN (WOL).

To sum up, the disclosure uses a mixed (or hierarchical) storage mode (that is, the use of two or more storage devices to alternately support the backup and access of files) to establish a low-cost and low power consumption personal cloud system. Compared with the personal cloud system 40, the personal cloud system 10 is more cost-effective and simpler in control logic because the personal cloud system 10 does not require the switching circuit 600.

Since a person having ordinary skill in the art can appreciate the implementation detail and the modification thereto of the method embodiment through the disclosure of the device embodiment, repeated and redundant description is thus omitted. Please note that the shape, size, and ratio of any element and the step sequence of any flow chart in the disclosed figures are exemplary for understanding, not for limiting the scope of this disclosure.

The aforementioned descriptions represent merely the preferred embodiments of this disclosure, without any intention to limit the scope of this disclosure thereto. Various equivalent changes, alterations, or modifications based on the claims of this disclosure are all consequently viewed as being embraced by the scope of this disclosure.

What is claimed is:

1. A data management circuit with network functions, coupled to a processor of a computer and providing the computer with network accessing capabilities, comprising:
   a network interface;
   a memory storing a plurality of program instructions;
   a first data transmission interface;
   a second data transmission interface; and
   a control unit, which is coupled to the processor through the first data transmission interface, coupled to a storage device through the second data transmission interface, and coupled to the memory, executing the program instructions to perform the following steps:
   receiving a network packet from the network interface;
   sending the network packet to the processor through the first data transmission interface or accessing the storage device, according to a comparison of a port number, an internet protocol address or a media access control address of the network packet with a predetermined port number, a predetermined internet protocol address, or a predetermined media access control address; and
   requesting the processor to access the storage device when a remaining capacity of the storage device is smaller than a threshold value or when the storage device does not store a file designated by the network packet.

2. The data management circuit of claim 1, wherein the storage device is a first storage device, and the computer comprises a second storage device coupled to the processor, and when the remaining capacity of the first storage device is smaller than the threshold value, the control unit requests the processor to move part or all of the data in the first storage device to the second storage device.

3. The data management circuit of claim 1, wherein the storage device is a first storage device, and the computer comprises a second storage device coupled to the processor, and when the first storage device does not store the file designated by the network packet, the control unit requests the processor to read the file from the second storage device and write the file to the first storage device.

4. The data management circuit of claim 1, wherein the processor and the second data transmission interface are coupled to the storage device through a switching circuit, the switching circuit connects the storage device to the processor or the control unit, and the control unit further performs the following step:
   controlling the switching circuit to connect the processor with the storage device when the processor needs to access the storage device.

5. The data management circuit of claim 1, wherein the processor is coupled to the storage device through the control unit, the control unit determines whether the processor can access the storage device, and the control unit further performs the following step:
   allowing the processor to access the storage device when the processor needs to access the storage device.

6. The data management circuit of claim 1, wherein the control unit transmits a content of the network packet to the storage device through the second data transmission interface when the computer is in a sleep mode or powered off, and the control unit further performs the following step:
   waking up or powering on the computer when the remaining capacity of the storage device is smaller than a threshold value or when the storage device does not store a file designated by the network packet.

7. The data management circuit of claim 1, wherein the second data transmission interface is a universal serial bus interface, and the storage device is an external USB storage device supporting hot swap.

8. The data management circuit of claim 1, wherein the second data transmission interface is a secure digital interface.

9. A network-based data management method for managing a storage device coupled to a computer that comprises a processor, comprising:

receiving a network packet through a network;

sending the network packet to the processor or accessing the storage device, according to a comparison of a port number, an internet protocol address or a media access control address of the network packet with a predetermined port number, a predetermined internet protocol address, or a predetermined media access control address; and requesting the processor to access the storage device when a remaining capacity of the storage device is smaller than a threshold value or when the storage device does not store a file designated by the network packet.

10. The method of claim 9, wherein the storage device is a first storage device, and the computer comprises a second storage device coupled to the processor, the method further comprising:

requesting the processor to move part or all of the data in the first storage device to the second storage device when the remaining capacity of the first storage device is smaller than the threshold value.

11. The method of claim 9, wherein the storage device is a first storage device, and the computer comprises a second storage device coupled to the processor, the method further comprising:

requesting the processor to read the file from the second storage device and write the file to the first storage device when the first storage device does not store the file designated by the network packet.

12. The method of claim 9, wherein the processor is coupled to the storage device through a switching circuit, the method further comprising:

controlling the switching circuit not to connect the processor with the storage device when the storage device is being accessed; and controlling the switching circuit to connect the processor with the storage device when the processor needs to access the storage device.

13. The method of claim 9 further comprising:

not allowing the processor to access the storage device when the storage device is being accessed; and allowing the processor to access the storage device when the processor needs to access the storage device.

14. The method of claim 9 further comprising:

transmitting a content of the network packet to the storage device when the computer is in a sleep mode or powered off; and waking up or powering on the computer when the remaining capacity of the storage device is smaller than a threshold value or when the storage device does not store a file designated by the network packet.

15. The method of claim 9, wherein the storage device is an external USB storage device supporting hot swap.

16. The method of claim 9, wherein the second data transmission interface is a secure digital interface.

* * * * *